United States Patent
Hamilton

[15] 3,658,104
[45] Apr. 25, 1972

[54] FELLER BUNCHER INCLUDING DOUBLE BUNK TRAILER

[72] Inventor: Douglas D. Hamilton, Mount Royal, Canada

[73] Assignees: Canadian International Paper Company, Montreal, Quebec; Quebec North Shore Paper Company, Quebec; Ste. Anne Paper Company Limited, Beaupre, Quebec, Canada, part interest to each

[22] Filed: Jan. 30, 1970

[21] Appl. No.: 7,088

[30] Foreign Application Priority Data

Feb. 5, 1969    Canada..................................042,057

[52] U.S. Cl. ....................144/309 AC, 214/506, 298/20 R
[51] Int. Cl. ..........................................................A01g 23/02
[58] Field of Search ................214/3 R, 501, 506; 298/20 R, 298/20 A; 144/309 AC, 2 Z, 3 D, 34 R

[56] References Cited

UNITED STATES PATENTS

| | | | |
|---|---|---|---|
| 2,112,201 | 3/1938 | Larison | 298/20 A |
| 3,498,347 | 3/1970 | Vit | 144/3 D |
| 3,533,458 | 10/1970 | McColl | 144/3 D |
| 2,860,005 | 11/1958 | Webster | 298/20 R |
| 3,527,271 | 9/1970 | Chateauneuf | 144/3 D |

FOREIGN PATENTS OR APPLICATIONS 141,689    2/1961    U.S.S.R...............................144/3 D

Primary Examiner—Gerald A. Dost
Attorney—Jacobi, Lilling & Siegel

[57] ABSTRACT

A tree feller skidder including a mobile self-propelled articulated vehicle having a boom mounted thereon having a felling head pivotally attached to the free end of the outermost boom section for felling trees and loading the same onto a pair of horizontally spaced bunks. The pair of bunks are interconnected by an articulated frame for moving the bunks in a direction toward and away from one another and simultaneously with moving the trailing bunk toward the bunk located forwardly thereof it is lowered, dropping the trailing end of a load of trees onto the ground facilitating unloading the same by moving the entire vehicle forward. The pair of bunks, in one instance, are mounted upon a trailer and, in another instance, one bunk is mounted on and carried by the vehicle with the trailing bunk located on a trailer attached to the vehicle. The forwardly located bunk includes crescent-shaped arms pivotally mounted thereon or other means associated therewith for anchoring a load of trees to the bunk, retaining the trees in position relative to such bunk during movement of the other bunk in a direction toward the same. Movement of the rear bunk toward the front bunk is effected by retracting the articulated member interconnecting the same and, in so doing, the pivotally connected portion of the articulated member passes up between the load on the bunks. This, in one instance, is facilitated by load dividers located on the bunk and/or articulated member.

12 Claims, 7 Drawing Figures

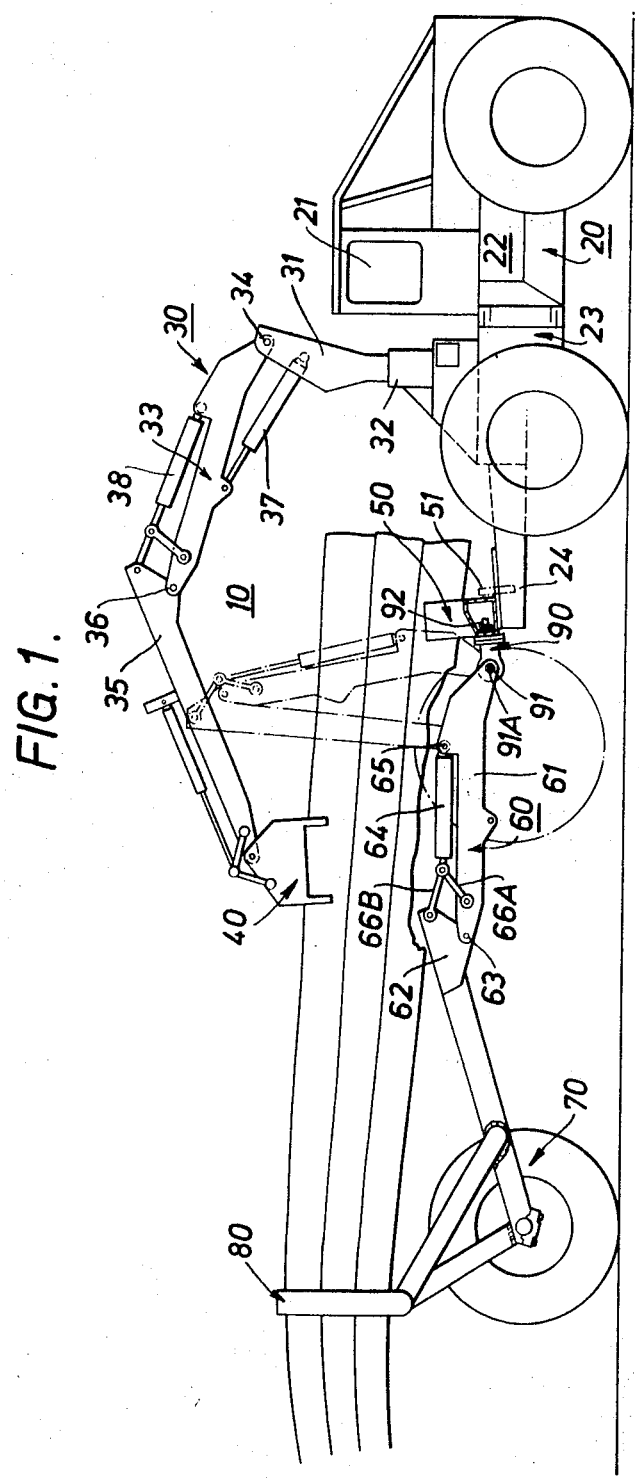

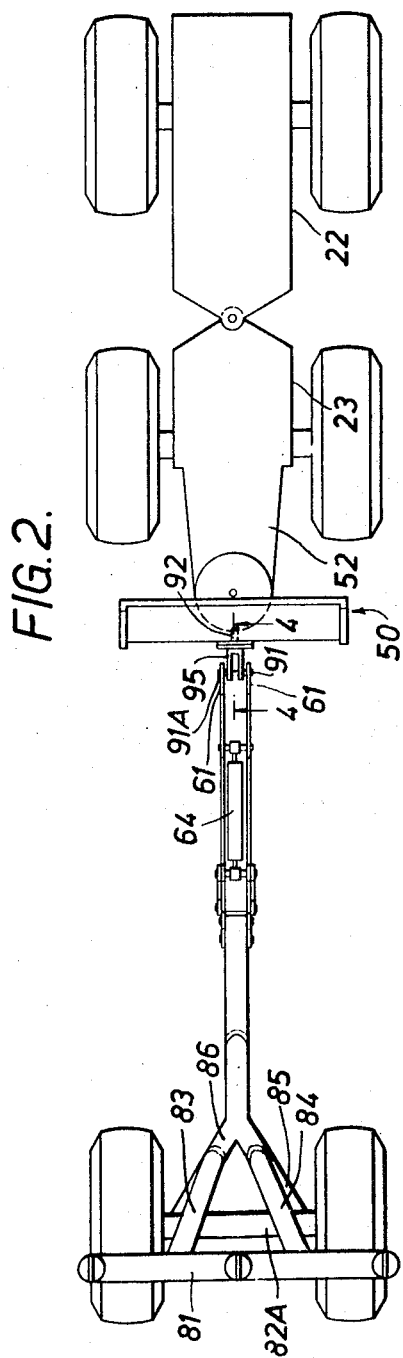

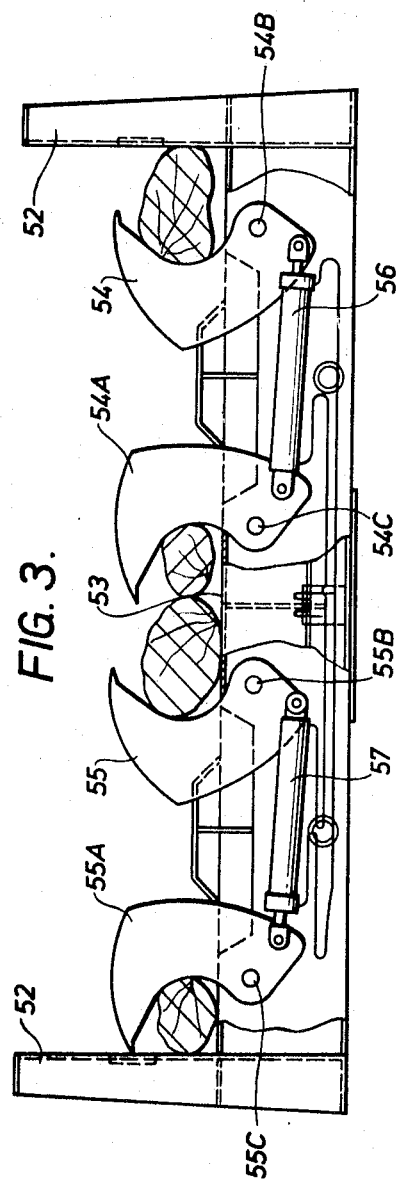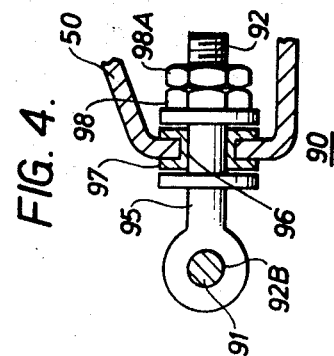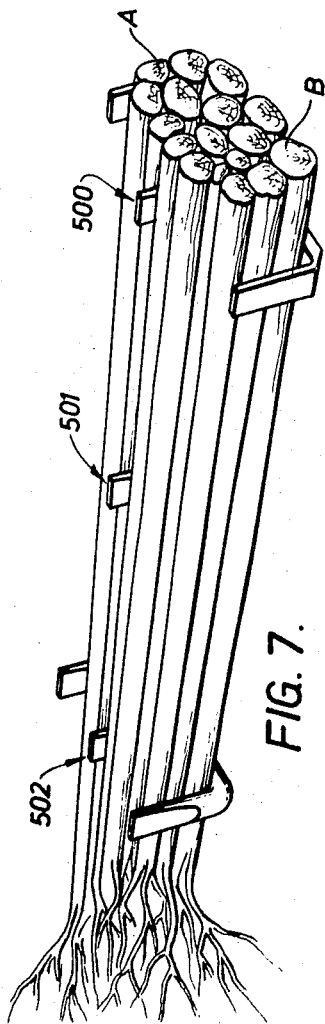

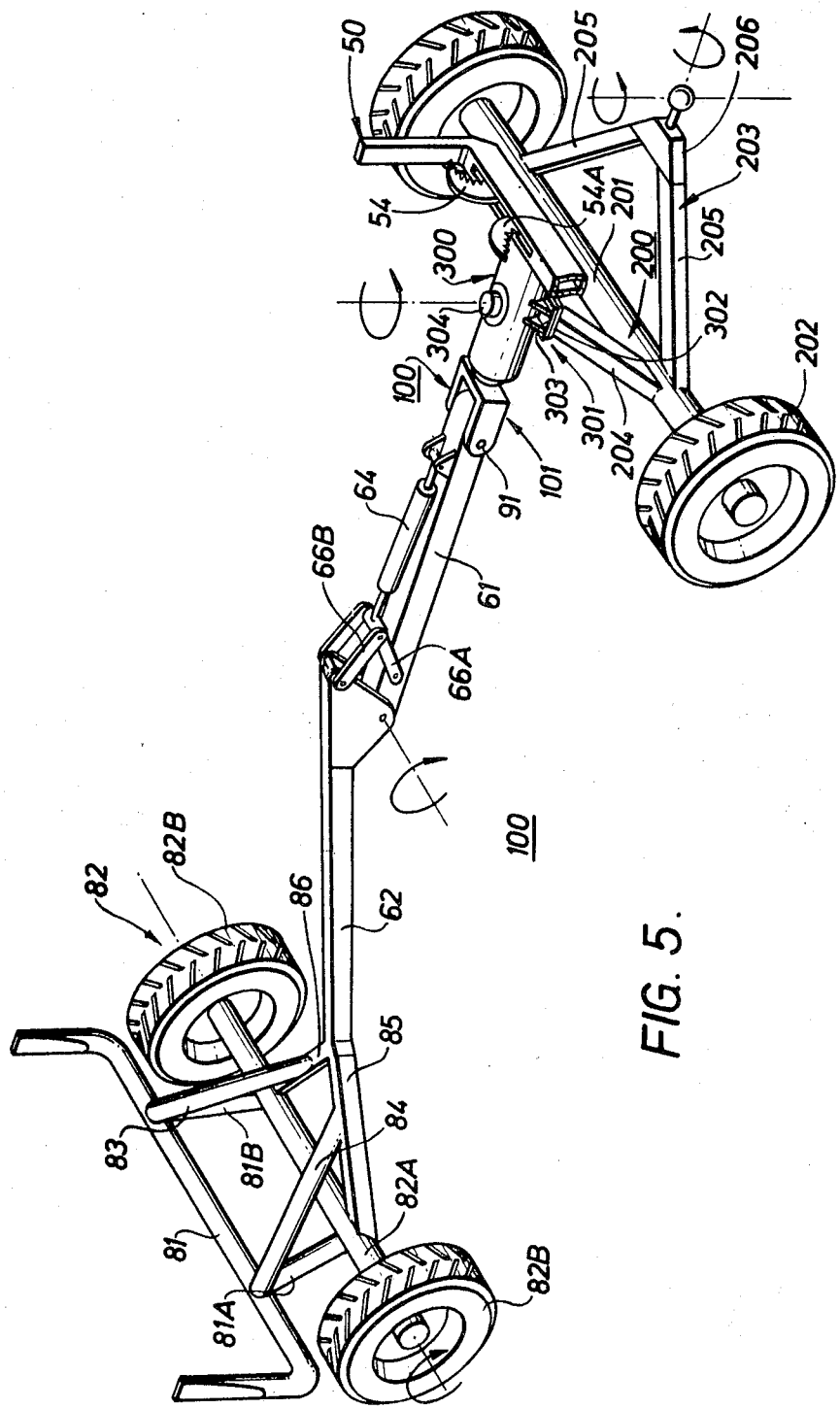

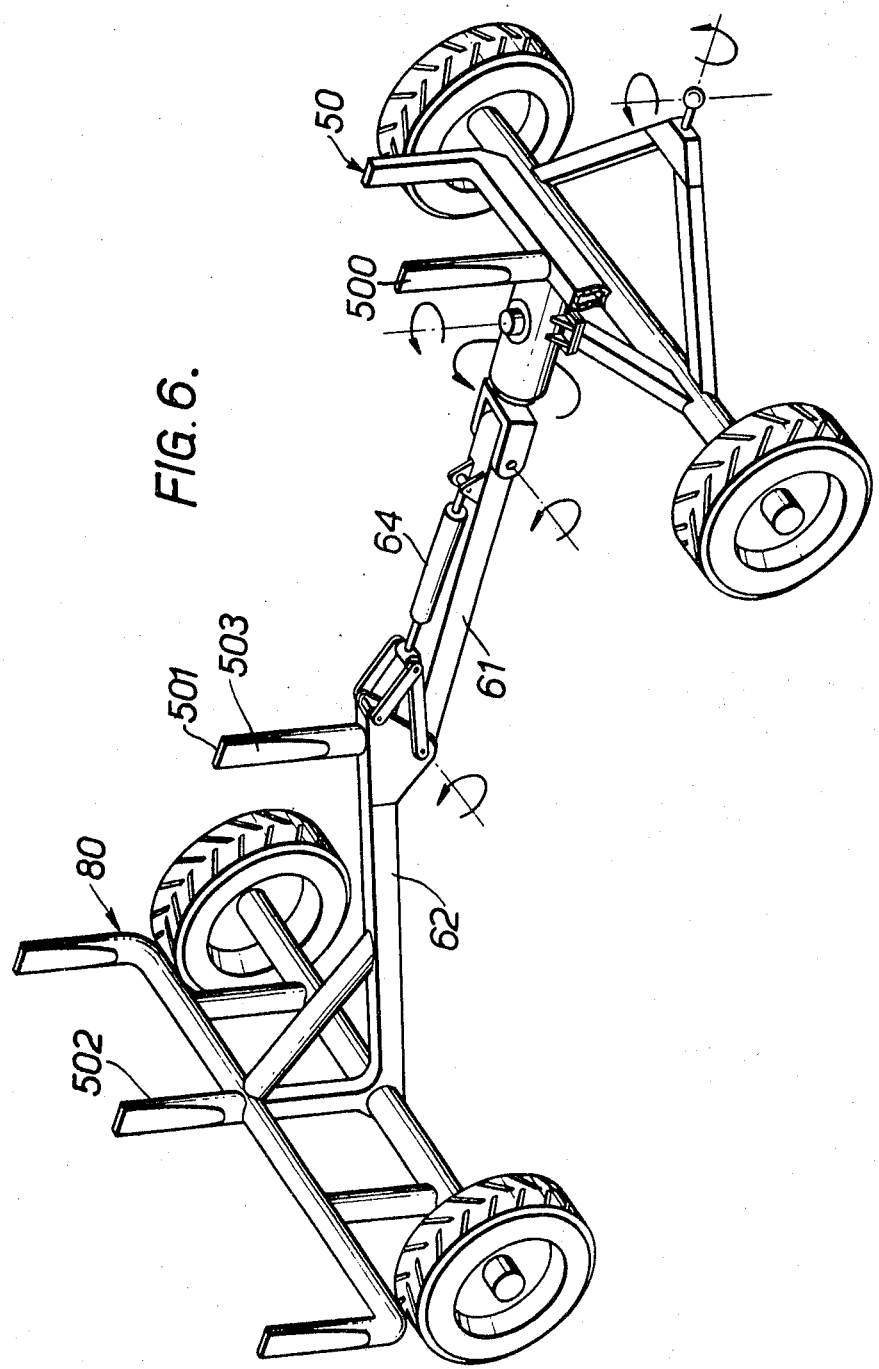

FELLER BUNCHER INCLUDING DOUBLE BUNK TRAILER

This invention relates to an apparatus for handling loads of varying lengths including long loads and particularly relates to such apparatus for use with tree harvesting and/or processing machines or the like.

One type of tree harvesting machine to which the invention relates is the felling-loading type. One such type machine which includes a felling head on the end of an extendible and retractable boom secured to a self-propelled mobile vehicle as disclosed in Canadian Pat. Nos. 837,395 and 840,775 issued, respectively, Mar. 24, 1970 and May 5, 1970. The foregoing machines, as well as others, skid their loads by moving the vehicle while supporting one end of the trees on a bunk arrangement attached to the vehicle with the opposite ends of the tree supported directly on the ground. The bunk arrangement, as is already know, includes securing means for a first layer of trees placed on the bunk so as to form a platform or tray upon which further trees are piled.

An important advantage of machines of the aforementioned type is their ability to handle long loads particularly in respect of unloading. In this regard the load may be discharged quickly from the machine while on the move and in such a way as to avoid undue scattering of the load which is most important from the point of view of further efficient handling of the same trees. Control for the unloading operation is performed from the prime mover operator's station.

A further important feature of the foregoing machines is their manoeuverability in confined spaces.

Machines of the aforementioned type have proven most efficient when designed for load carrying capacities of trees which will produce from one to one-half cunits of processed wood and when working in a cutting area a given distance from tree processing equipment to which they deliver their loads.

It will be appreciated that as the distance between the cutting area and the tree processing equipment increases, the travel time in hauling the load to the processing equipment increases and thus contributes to inefficiency in the operation particularly when handling small loads. Economic studies have shown that this inefficiency may be compensated by increasing the load carrying capacity of the machine. Based on woodlands operation studies, it has been found advisable to increase such load carrying capacities by as much as 200 percent, namely trees which will produce from two to three cunits of processed wood.

Engineering studies have been carried out on such machines, namely those which skid their loads, with a view to increasing their load handling capacities by such amounts mentioned and have shown in one aspect, considerable increased power demand which results in lower efficiency of the machine. However, by substituting a trailer means in place of the skidding means, it has been found appreciably little increase in power demand is required and thus efficiency of the machine is maintained. The distinction to be noted here is one of load carrying capacity versus load handling capacity. To provide additional carrying capacity, it is necessary to carry more of the load's weight on the vehicle and with long loads, as the trees are, a trailer arrangement is necessary. A number of tree harvesting machines which include trailer means are known as exemplified by Swedish Pat. No. 217,319 issued to Säll Nov. 28, 1967; U.S. Pat. No. 3,269,436 issued to Moore Aug. 30, 1966; and U.S. Pat. No. 3,340,912 issued to Williams et al., Sept. 12, 1967.

In all of the foregoing patented devices, a trailer of various designs is disclosed, and are, except for Swedish Pat. No. 217,319 in one aspect, designed for long loads. A prime disadvantage common to the foregoing examples and other known trailers designed specifically for handling long loads, is their inability to discharge their loads in confined spaces and at the same time deposit the loads onto the ground or the like in such a way as to avoid scattering of the load.

A particular example in respect of confined spaces in which machines in accordance with the present invention must manoeuver during unloading is at a tree processing landing wherein a processing machine operates between a row of processed trees and a row of unprocessed trees. In such an instance, trees to be processed are hauled and dumped in a row having the butt ends thereof substantially in alignment and at a selected distance from the row of processed trees. The butt end of the trees are the closest to the row of processed trees and since the trees are dragged by their butt end it is necessary for the skidder vehicle to unload in the space between the two rows. The space is selected such as to suit the processing machine, i.e. so that the processing machine's movement is limited to one which is parallel to the row of processed trees.

It will be readily appreciated that having the rows of processed and unprocessed trees in fixed spaced relationship relative to one another and requiring the long loads to be dumped in the fashion described, particularly from a trailing arrangement, and having limited space for manoeuvering the load carrier, particularly against a wall of processed trees, requires a vehicle which possesses both a long wheel base for supporting the long loads and a short wheel base to provide a small turning circle in the confined space.

Another disadvantage of the prior art devices is that the trailer itself engages the entire load with no contact being made between the load (logs or trees) and the self-propelled vehicle. In such an arrangement, the load does not contribute to transferring any forces from the trailer to the vehicle.

Machines for hauling logs having a trailing load-supporting unit movable relative to further carrying means attached to or mounted on a tractor are known as exemplified by U.S. Pat. Nos. 3,028,030 issued to M. Wylie Apr. 3, 1962; 2,820,557 issued to R. Emanuel Jan. 21, 1958; and 2,540,803 issued to R. R. Alexander et al., Feb. 6, 1951. In each of the latter patented structures the trailing load-supporting member is supported upon wheeled units which are slidable along a beam or reach toward the forward load-carrying means.

A principal object of the present invention is to provide improvements in devices of the latter patented structures with some improvement relating to means for interconnecting the rearward and forward load-carrying members consisting of an articulated reach connected to the rear load-carrying assembly in such a manner that the latter is tipped to facilitate depositing the trailing end of the load on the ground prior to removing the load from the forward load-carrying assembly.

A further principal object of the present invention is to provide a load-transporting assembly with an improved method of unloading the same. Accordingly, in accordance with one aspect of the invention, there is provided a method of discharging a load from a trailer means having two spaced apart load supports comprising the steps of anchoring the load to one of said supports, moving the other of said load supports in a direction toward the first-mentioned support thereby shortening the effective length of the apparatus and simultaneously with shortening the effective length, lowering the end of the load remote from the anchored end portion onto the ground, releasing the anchored end portion of the load and removing said trailer means in a direction away from the load engaged by the ground to discharge the entire load from said supports.

In a further aspect of the present invention, there is provided a load-handling apparatus comprising in combination:

a. a mobile prime mover including an operator station and a first load-supporting means attached to said prime mover;

b. a second load-supporting means, including a bunk pivotally mounted on ground engaging means and positionable in selected spaced relation relative to said first load-supporting means;

c. extendible and retractable frame means interconnecting said second load-supporting means and said prime mover to selectively variously adjust the spacing between said supports;

d. means supporting said bunk on said second support lowering the same in response to retraction of said frame;

e. power means to move said second load-supporting means relative to said prime mover; and f. means to effect controlled operation of said power means.

In a further aspect of the present invention, there is provided the foregoing aspect including a boom means having a grapple means or felling head means secured to the free end thereof.

In a further aspect of the present invention, there is provided a load handling apparatus comprising in combination:

a. at least a pair of load-supporting means positionable in selected spaced relation relative to one another and each being supported on ground-engaging means;

b. frame means interconnecting said pair of load-supporting means;

c. motor means to move at least one of said load-supporting means relative to the other;

d. means to interconnect one of said load-supporting means or ground engaging means to a prime mover; and e. means to effect controlled operation of said motor means.

It is thus appreciated that in one aspect the apparatus is self-contained and may be attached to any type of prime mover and in another aspect is combined with a prime mover, the latter providing a compact arrangement affording good manoeuverability characteristics.

An important feature of the present invention concerns the position of the load-supporting means, at the trailing end of the trailer means, in respect of the ground supporting means. In the preferred form, the load-supporting means is positioned in such a way that it provides, when supporting a load, a positive moment about said ground-supporting means and thus assists the movement of the ground-supporting means in a direction towards the prime mover, thus reducing the power requirement for effecting such movement.

Another important feature of the present invention concerns the ground-supporting means which in one aspect may feature wheels which are sprung or unsprung and are powered directly by motor means within the wheels, or indirectly by propeller drive shaft means connected to a suitable power source.

A further feature which may be added to the apparatus, if desired, is a means to retain the full load adjacent either or both of the said load-supporting means, such means may include grapple means.

Yet a further important feature of the invention disclosed is the ability to load the trailer means from a point directly above the same.

Other objects and advantages will become apparent from the detailed description hereinafter.

The invention is illustrated, by way of example, in the accompanying drawings wherein:

FIG. 1 is a side elevation part sectional view of a load handling apparatus in accordance with the present invention with the full line showing the trailer means portion in extended position for load carrying and the retracted position of the trailer means portion when discharging the load in dotted line;

FIG. 2 is a plan view of the apparatus shown in FIG. 1;

FIG. 3 is a rear elevational, partial sectional view of the bunk mounted on the rear chassis of the vehicle illustrated in FIGS. 1 and 2;

FIG. 4 is a part sectional view taken along line 4—4 in FIG. 2;

FIG. 5 is a part sectional oblique view of a load-handling apparatus illustrating a further embodiment of the apparatus in accordance with the present invention;

FIG. 6 is similar to FIG. 5 illustrating a still further embodiment; and

FIG. 7 is a partial oblique view of the load dividing and supporting means shown in FIG. 6.

Referring now in detail to the drawings, FIG. 1 shows a load handling apparatus 10 consisting of a prime mover 20 including a boom assembly 30 having a tree felling head 40 mounted on the free end thereof, a load-supporting bunk 50 mounted adjacent the trailing end of the prime mover and a trailer arrangement 60 supported at its trailing end by an axle and wheel assembly 70 having a second load-supporting bunk 80 supported thereon.

The prime mover 20 may be of any type or of the articulated chassis type as illustrated. An operator's station 21 is shown mounted on the forward chassis 22 of the vehicle, and includes controls for both the prime mover and the auxiliaries namely the boom assembly 30, the tree felling head 40, the trailer arrangement 60 and the load-supporting bunk 50. The vehicle is supported on axles which may be pivotally connected to the chassis as disclosed in, for example, Canadian Pat. No. 797,644 Symons issued Oct. 29, 1968, or alternatively rigidly connected to the chassis, in which case rolling movement between the chassis is taken out at the articulated chassis' connector.

The boom assembly 30 is pivotally mounted for controlled movement about a substantially vertical axis on the trailing chassis 23 of the prime mover 20. It may be mounted at any alternative convenient location on the prime mover 20 or trailer arrangement 60. In particular it may be mounted on the prime mover directly above the operator's station being suitably controlled therefrom as, for example, disclosed in U.S. application Ser. No. 760,274 filed Sept. 16, 1968 and now U.S. Pat. No. 3,601,169. The boom assembly 30 may be of any suitable type or a commercially available knuckle type as illustrated. The particular boom illustrated is one known and marketed under the trade name "ROTOBOOM" by the John Deere Company. It comprises a post member 31 suitably mounted for rotary movement in a base housing 32 and controlled from the operator's station 21. An example of such suitable mounting and control is disclosed in the aforementioned Canadian Pat. No. 837,395. A first boom member 33 is pivotally connected to post member 31 by a suitable pivot connection 34. A second boom member 35 is pivotally secured to the first boom member 33 by a pivot pin 36. Relative movement between the boom members 33 and 35 and the post member 31 is effected by respective fluid cylinders 37 and 38 suitably mounted thereto and thereby control the positioning of the felling head 40 in respect of the prime mover 20. The felling head 40 may be of any suitable type as, for example, the type disclosed in Canadian Pat. No. 791,445 issued Aug. 6, 1968, and mounted on boom member 35 in the manner disclosed in the latter mentioned patent. Alternatively, the felling head 40 may be substituted by a grapple means of any suitable known type. Such grapple means may be used to supplement load retaining means which may be incorporated in the load-supporting bunk 50.

It will, therefore, be appreciated that the boom assembly 30 is mounted and controlled such that it will position the felling head 40 adjacent a standing tree located a selected distance from the apparatus 10 and subsequently fell and load the tree onto the load-supporting bunks 50 and 80 respectively.

The load-supporting bunk 50 is disclosed in U.S. Pat. No. 3,289,865 issued Dec. 6, 1966, and is of the type including load-retaining means thereon. As mentioned previously, one embodiment of the present invention discloses a pair of load-supporting bunks one of which includes full load or partial load-retaining means and this is a particularly important feature in respect of discharging the load from the trailer means as will be more fully appreciated from the description hereinafter.

The load-supporting bunk 50 is pivotally mounted in a fifth wheel fashion for movement about a substantially vertical axis via a pivot pin 51 mounted on a portion of the vehicle trailing chassis 23. The load-supporting bunk 50 is illustrated in FIG. 3 and is generally defined by a pair of vertically disposed end posts 52 and a horizontally disposed deck 53 extending therebetween. The bunk includes two pairs of tongs 54 and 54A forming one pair and tongs 55 and 55A forming the second pair. Tong 54 is pivotally mounted on pin 54B, tong 54A is pivotally mounted on pin 54C, tong 55 is pivotally mounted on pin 55B and tong 55A is pivotally mounted on pin 55C. The pins are suitably anchored to the structural members forming the deck. A hydraulic piston-cylinder assembly 56 is pivotally connected at opposed ends respectively to tongs 54 and 54A such that tongs 54 and 54A are free-floatingly interconnected. Similarly, tongs 55 and 55A are interconnected by a hydraulic piston-cylinder assembly 57. The tongs are arcuate shaped and by suitable actuation of hydraulic assemblies 56 and 57, individual trees or groups of trees may be anchored to the bunk at horizontally spaced positions and released for unloading or receiving further trees.

Alternatively, the load-supporting bunk 50 may be substituted by load-supporting bunk 80 described hereinafter, in which case the load-retaining means may consist of choker means such as a chain or the like or alternatively the grapple or another grapple connected to the boom 30 previously described.

The trailer assembly 60 consists of a pair of frame members 61 and 62 pivotally interconnected by a pin 63 which members, if desired and as illustrated, may be the same as boom members 33 and 35. Such an arrangement affords a saving in the number of different components making up the apparatus 10. A hydraulic piston-cylinder assembly 64 is pivotally connected at one end by a pin 65 to member 61 and at the other end by a pair of levers 66A and 66B respectively to members 65 and 62. Electric motor means or the like may be substituted for fluid cylinder 64 if desired.

Frame member 61 is pivotally connected to the portion 24 of the vehicle chassis 23 by a connector assembly 90 permitting the load-supporting bunk 80 and members 61 and 62 to rotate relative to the load-supporting bunk 50 about a pair of substantially horizontal axes positioned normal to one another namely axes passing through pivot pins 91 and 92 respectively. Pivot pin 91 passes through apertures 91A in frame member 61 and apertures 92B in a U-shaped member 95. Pivot pin 92 is rigidly secured to the U-shaped member 95 by welding or the like and passes through aperture 96 in thrust bearing 97, and is held in position by a nut 98 and lock nut 98A threaded onto the pin 92.

The load-supporting bunk 80 illustrated in FIGS. 1, 2 and 5 comprises a generally U-shaped member 81 secured to a wheel and axle assembly 82 by a pair of strut members 81A and 81B that are welded or otherwise structurally secured to member 81 and the assembly 82. The wheel and axle assembly 82 includes a main axle shaft member 82A having a pair of ground engaging wheels 82B journalled thereon. The wheels are located at opposed ends of the shaft member 82A and are journalled thereon by bearing assemblies in any well-known manner. A first pair of strut members 85 and 86 connect the axle shaft 82A to the frame member 62 reinforcing the assembly to prevent relative movement of the axle relative to the member 82. A second pair of strut members 83 and 84 interconnect member 81 and member 62 providing further reinforcement for the assembly.

In referring to FIGS. 1, 2 and 5, it will be readily seen that by actuation of the fluid piston-cylinder assembly 64, the trailer arrangement 60 wheel base may be selectively shortened or lengthened, by pivoting members 61 and 62 relative to one another about pivot pin 63 and thus loads of various lengths may be accommodated on the load-supporting bunks 80 and 50 respectively, or alternatively by actuating fluid piston-cylinder assembly 64 to lengthen the same, the load-supporting bunk 80 may be drawn towards the load supporting bunk 50, being assisted particularly if loaded by the load itself by virtue of the moment caused thereby about the axle assembly 82. This moment is caused by having, as previously indicated, the bunk member 81 located rearwardly of the axle 82A (see FIG. 1). It will be readily apparent the moment about the axle caused by the load on the rearwardly located bunk assists in the discharge of the load from the apparatus by lowering the trailing end of the load during retraction of the articulated connection interconnecting the front and rear bunks. During actuation of fluid piston-cylinder assembly 64, load retaining means (arms 54, 54A, 55 and 55A) of load-supporting bunk 50 restrains movement of the trees from forces applied to the trees by movement of the bunk assembly 80. After the bunk 80 has been moved forwardly toward bunk 50, the load retaining means on the latter may be released and the prime mover 20 driven forward in a direction away from the load to unload the same. The load will contact the ground in such a way as to prevent undue scattering of the same. Equally important will be the fact that such unloading operation has been accomplished with minimum forward movement of the prime mover 20 thus allowing the apparatus 10 to manoeuver in a confined space during the total unloading operation. The retracted wheel base position, i.e. bunk 80 moved forward toward bunk 50 may be maintained for convenience during travelling without a load.

In referring to FIG. 5, there is illustrated a modified load-handling apparatus 100 of a four-wheeled trailer type and having load-supporting bunks 50 and 80 mounted thereon. In this embodiment of the invention, means is provided for independent attachment of the apparatus to any suitable type of prime mover. It further affords the convenience that in the event that the prime mover is a multi-function machine such as, for example, a tree felling-loading machine, besides being a tractor unit, it may remain in a selected location for further felling activity when the trailer becomes fully loaded. Thus the trailer not being part of the prime mover is simply unhitched for subsequent towing to a further selected location, namely a tree processing landing.

Referring now in detail to FIG. 5, the trailer arrangement 100 consists of previously described trailer assembly 60 connected to a front bogy 200 by a connector assembly 100 which may be substantially the same as connector assembly 90. The connector assembly 100 includes a yoke member 101 pivotally connected to member 61 by pin 91 and pivotally connected at the opposite end portion to a frame assembly 300, the latter pivot axis extending longitudinally of the trailer. The housing assembly 300 is supported on the bogy 200 by a turntable assembly 301 including face-to-face abutting plates 302 and 303 on respective assemblies 300 and 200 and a pivot pin 304. Pivot pin 304 allows the bogy 200 to pivot about a substantially vertical axis allowing the trailer 100 to turn. The bogy 200 consists of a wheel and axle assembly 201 having a pair of wheels 202 journalled thereon and a drawbar 203. A pair of strut members 204 are secured to the axle 201 and bearing plate 302 of the turntable. The drawbar 203 includes a pair of strut members 204 and 205 connected by welding or other suitable means to the axle 201 at one end and to each other via a ball coupling member 206 at the other end, the ball being adapted to be connected to a captive ball socket on a prime mover. Mounted on the forward end of member 300 and rigidly secured thereto is a bunk assembly 50 having tree engaging and anchoring arms 54, 54A, etc. thereon.

Referring to FIGS. 6 and 7, in one form the modification includes load divider uprights 500, 501 and 502 secured respectively to the front bunk 50, member 62, and the rear bunk 80. The load dividers project upwardly from the respective members and are located approximately in alignment substantially along the central axis of the trailer. The load dividers may each be tapered upwardly to terminate in a relatively narrow upper end portion 503, if desired, as illustrated in the drawings. The use of three dividers affords controlled load distribution preventing movement of the total load from one side of the load-supporting bunks to the other and thus, in some circumstances, may provide improved stability. The load divider 501 also serves to separate the load on the bunks providing an opening for receiving frame members 61 and 62 when the latter are pivoted relative to one another to a load-discharge position. It will be readily apparent, and as illustrated in FIG. 1, in a fully discharge position the members 61 and 62 are substantially vertical with the pivotally connected ends being located vertically above the load.

In a still further alternative embodiment, load dividers 500 and 502 may be omitted, using only the divider 501 secured to member 62 serving the dual function of a load divider and load separator forming a path through the load for members 61 and 62 to follow during pivoting of one relative to the other.

In a still further alternative embodiment, the member 501 may be substantially shorter than that illustrated in FIG. 6 such that it does not serve as a load divider with the vehicle in a fully extended position but serves to separate the load during discharge of the same by forming a passage through the load to receive the members 61 and 62.

FIG. 7 illustrates a load of trees on the vehicle which includes portions A and B separated by the load dividers 500, 501 and 502. The space between load portions A and B should preferably be at least as great as the width of members 61 and 62 to permit ready passage of the same between the load portions during collapsing of the trailer.

In the foregoing embodiments, the front bunk 50 has retaining means consisting of arcuate arms pivotally mounted on the bunk and actuated by hydraulic cylinder assemblies. Obviously, the arcuate arms may be disposed of in place of some other suitable anchoring means such as choker assemblies or the like.

In a still further alternative embodiment, the front bunk 50 may be the same as rear bunk 80, that is, devoid of tree retaining means in which case the trees may be held in position at the will of the operator by clampingly engaging the load with the grapple of the felling head assembly 40. Alternatively, in a still further embodiment, the felling head 40 may be replaced by a single grapple for use in loading trees onto the vehicle and the grapple, and in such event, may be of sufficient size as to embrace at least a major portion of the load.

Referring now to the operation of the apparatus shown in FIG. 1, the prime mover 20 including trailer arrangement 60 is driven into an area of standing trees. The operator seated in operator's station 21, positions the prime mover 20 such that the boom assembly 30 may be extended to allow the felling head 40 to engage and sever a standing tree which is subsequently manoeuvered into position on load supporting bunks 50 and 80. Load-retaining means on the supporting bunk 50 may be actuated to secure the load or part of it as it is placed upon the load supporting bunks. The fluid cylinder 63 may be activated in order to adjust the loading bunk 80 positioned relative to loading bunk 50 so as to best accommodate the load length. Once the trailer arrangement 60 becomes filled to capacity, it is towed by the prime mover to a selected location whereupon the load is discharged in the manner as previously described. A similar method of operation applies to the combination of prime mover 20 or any other prime mover and either of the trailer arrangements shown in FIGS. 5 or 6 except in the latter instance the trailer may be detached from the prime mover 20 when desired and the operation of felling and collecting trees continued by using another similar trailer.

Power for the various actuators is transmitted by suitable means from a power means located on the prime mover 20 and is suitably controlled from the operator's station 21. The various actuators may be as illustrated or other suitable means within the purview of a skilled mechanic. Although no specific power means, power transmitting means, or control means for the various actuators has been illustrated, they may comprise for example as follows; a fluid pump drivingly connected to the prime mover's power means and being piped or hosed to the prime mover's fluid supply. The fluid power from the pump may be carried by suitable piping or hosing to the various actuators via suitable flow control valves located within operator's station 21. The latter mentioned piping or hosing should include quick-release type connectors at the connection point between the prime mover 20 and the applicable trailer arrangements as shown in FIGS. 1, 5 and 6 so as to facilitate simple hitching and unhitching operations.

It will be appreciated that the wheels of the trailer may be powered if desired such as by a motor means incorporated directly within each wheel or by a prop-shaft drive powered from a source on the prime mover 20.

I claim:

1. A load-handling apparatus comprising in combination:
  a. a mobile prime mover including an operator's station;
  b. a first load-supporting means attached to said prime mover;
  c. a second load-supporting means carried on ground engaging means separate from said prime mover and positionable in various selected spaced positions relative thereto;
  d. retractable and extendible frame means interconnecting said second load-supporting means to said prime mover comprising a first frame member pivotally connected to a second frame member for articulate movement about a substantially horizontal axis, said motor means being connected to each of members effecting movement of said first frame member relative to said second frame member, one of said frame members being rigidly connected to said second load-supporting means and the other member being connected to said prime mover for pivotal movement about a pair of substantially horizontal axes positioned normal to one another;
  e. means vertically lowering said second support means in response to retraction of said frame;
  f. power means to move said first and second load-supporting means relative to one another to vary the distance therebetween; and
  g. means to effect controlled operation of said power means.

2. A load-handling apparatus as defined in claim 1 including means to divide a load along an axis parallel to its length when placed on said load-supporting means so as to facilitate movement of said frame means interconnecting said second load-supporting means and said prime mover between said load.

3. A load-handling apparatus comprising in combination:
  a. a mobile prime mover including an operator's station;
  b. a first load-supporting means comprising a bunk having load anchoring means attached thereto and operable from said operator's station selectively to grasp and release a load of trees or the like thereon, attached to said prime mover;
  c. a second load-supporting means carried on ground engaging means separate from said prime mover and positionable in various selected spaced positions relative thereto;
  d. retractable and extendible frame means interconnecting said second load-supporting means to said prime mover;
  e. means vertically lowering said second support means in response to retraction of said frame whereby a load carried on said first and second load-supporting means in a frame extended position and anchored to the bunk of the first load-supporting means by said load anchoring means is lowered as the load projects beyond the second load-supporting means during retraction of the frame facilitating unloading of said load;
  f. power means to move said first and second load-supporting means relative to one another to vary the distance therebetween; and
  g. means to effect controlled operation of said power means.

4. A load-handling apparatus as defined in claim 3 wherein each of said first and second load-supporting means includes a substantially U-shaped frame for receiving and retaining a load of trees.

5. A load-handling apparatus as defined in claim 3 wherein said first load-supporting means is pivotally mounted on the prime mover for selected movement about a substantially vertical axis.

6. A load-handling apparatus as defined in claim 3, including motor drive means mounted in said wheels for propelling the same along the ground.

7. A load-handling apparatus as defined in claim 3 wherein said second load-supporting means includes a portion engaging the load carried thereby at a position having a greater distance from the first support means than the spacing between said first support and the said ground engaging means causing a moment tending to move said ground engaging means toward said first load supporting means.

8. A load handling apparatus comprising in combination:
  a. a mobile prime mover including an operator's station;

b. a first load-supporting means attached to said prime mover;

c. a second load-supporting means carried on ground engaging means separate from said prime mover and positionable in various selected spaced positions relative thereto;

d. retractable and extendible frame means interconnecting said second load-supporting means to said prime mover;

e. means vertically lowering said second support means in response to retraction of said frame;

f. power means to move said first and second load-supporting means relative to one another to vary the distance therebetween;

g. means to effect controlled operation of said power means; and h. load-dividing apparatus comprising a rigid upwardly directed post on each of said first and second load supports and the extendible and retractable frame interconnecting the same.

9. A first and second pair of load-carrying bunks each supported upon wheels, tracks, or the like assemblies interconnected and held in spaced relationship by an extendible and retractable member, said first bunk having means thereon positively gripping all or part of a load of trees carried by said pair of bunks to hold the load fixed relative to said first bunk while the second bunk is moved toward the first by retracting said member and means mounting second bunk on the supporting wheels associated therewith, lowering said second bunk simultaneously with retraction of said member.

10. A load-carrying apparatus as defined in claim 9 characterized in that said second bunk is positioned vertically above the support means associated therewith and at a horizontal position relative thereto such that a load thereon tends to rotate the bunk in a direction opposite to the movement of the bunk as it is drawn toward the first bunk creating a positive moment assisting in overcoming the restriction to forward motion of the second bunk.

11. A method of discharging a load from a trailer means having spaced apart load supports comprising the steps of:
   a. anchoring the load to one of said supports;
   b. moving the other of said load-supporting means in a first direction toward the support having the load anchored thereto, thereby shortening the effective length of the apparatus;
   c. lowering said other load-supporting means, depositing the end of the load projecting therebeyond onto the ground;
   d. releasing the anchor of said load; and
   e. moving said trailer means in said first direction to discharge the load from said supports.

12. A method as defined in claim 11 wherein said other load-supporting means is lowered in response to movement of the latter in said first direction toward the support on which the load is anchored.

* * * * *

PO-1050
(5/69)

UNITED STATES PATENT OFFICE
CERTIFICATE OF CORRECTION

Patent No. 3,658,104          Dated April 25, 1972

Inventor(s) Douglas D. Hamilton

It is certified that error appears in the above-identified patent and that said Letters Patent are hereby corrected as shown below:

On the first or front page of this patent in the left hand column under paragraph number [73], Assignees: lines 3 and 4, "Ste. Anne Paper Company Limited," should read -- Abitibi St. Anne Paper Ltd. --

Signed and sealed this 12th day of March 1974.

(SEAL)
Attest:

EDWARD M. FLETCHER, JR.
Attesting Officer

C. MARSHALL DANN
Commissioner of Patents